(12) United States Patent
Nock et al.

(10) Patent No.: US 9,469,220 B2
(45) Date of Patent: Oct. 18, 2016

(54) SEAT RECLINER WITH EASY ENTRY RELEASE AND METHOD OF MANUFACTURING SAME

(71) Applicant: Lear Corporation, Southfield, MI (US)

(72) Inventors: Eckhard Nock, Wolnzach (DE); Johannes Barzen, Pfaffenhofen (DE); Norbert Hertling, Munich (DE)

(73) Assignee: Lear Corporation, Southfield, MI (US)

( * ) Notice: Subject to any disclaimer, the term of this patent is extended or adjusted under 35 U.S.C. 154(b) by 169 days.

(21) Appl. No.: 14/349,742

(22) PCT Filed: Oct. 5, 2012

(86) PCT No.: PCT/US2012/058867
§ 371 (c)(1),
(2) Date: Apr. 4, 2014

(87) PCT Pub. No.: WO2013/052743
PCT Pub. Date: Apr. 11, 2013

(65) Prior Publication Data
US 2014/0239693 A1    Aug. 28, 2014

Related U.S. Application Data

(60) Provisional application No. 61/626,973, filed on Oct. 6, 2011.

(51) Int. Cl.
*B60N 2/22* (2006.01)
*B60N 2/68* (2006.01)
(Continued)

(52) U.S. Cl.
CPC ............. *B60N 2/2213* (2013.01); *B23K 26/28* (2013.01); *B60N 2/20* (2013.01); *B60N 2/2252* (2013.01); *B60N 2/2254* (2013.01); *B60N 2/2356* (2013.01); *B60N 2/682* (2013.01)

(58) Field of Classification Search
CPC .... B60N 2/2213; B60N 2/20; B60N 2/2252; B60N 2/2356; B60N 2/682; B23K 26/28
USPC .............................. 297/361.1; 29/11, 525.14
See application file for complete search history.

(56) References Cited

U.S. PATENT DOCUMENTS 5,211,327 A * 5/1993 Clarke .................. B23K 10/02
219/121.14
5,536,217 A    7/1996 Droulon et al.
(Continued)

FOREIGN PATENT DOCUMENTS

CN    1796175 A    7/2006
CN    101544202 A    9/2009
(Continued)

OTHER PUBLICATIONS

Office Action issued on Jun. 15, 2015 from German Patent Office in corresponding German application No. 112012004173.9.
(Continued)

*Primary Examiner* — Milton Nelson, Jr.
(74) *Attorney, Agent, or Firm* — Brooks Kushman P.C.

(57) ABSTRACT

A vehicle seat and seat back adjustment mechanism are disclosed that provide for adjusting the angle of inclination of a seat base relative to a seat base and also permit easy entry to the area behind the seat by allowing the seat back to be released to move between an adjusted angle of inclination and a position in which the seat back is folded over the seat base. The adjustment mechanism includes at least one comfort tilt recliner mechanism and one easy entry recliner mechanism that are joined via a first interface and a second interface face each, respectively, located on the outer surfaces of the facing plates of the two mechanisms by a radial laser welding process, such that the mechanisms may be coaxially attached to the vehicle seat to permit the seat back to pivot about a single axis.

10 Claims, 6 Drawing Sheets

(51) Int. Cl.
*B60N 2/225* (2006.01)
*B60N 2/20* (2006.01)
*B60N 2/235* (2006.01)
*B23K 26/28* (2014.01)

(56) References Cited

U.S. PATENT DOCUMENTS

| | | |
|---|---|---|
| 5,611,599 A | 3/1997 | Baloche et al. |
| 5,755,491 A | 5/1998 | Baloche et al. |
| 7,240,965 B2 | 7/2007 | Messerschmidt et al. |
| 7,497,520 B2 | 3/2009 | Assman |
| 7,677,665 B2 | 3/2010 | Eppert et al. |
| 7,967,384 B2 * | 6/2011 | Hille ............... B23K 15/0006 16/239 |
| 2007/0126272 A1* | 6/2007 | Deptolla ............... B60N 2/206 297/362.11 |
| 2009/0072601 A1 | 3/2009 | Geisler et al. |
| 2009/0072605 A1 | 3/2009 | Otto et al. |
| 2010/0181816 A1 | 7/2010 | Kienke et al. |
| 2010/0320823 A1 | 12/2010 | Thiel |
| 2011/0006583 A1 | 1/2011 | Schwarze et al. |
| 2011/0181088 A1 | 7/2011 | Zhang et al. |
| 2012/0205956 A1* | 8/2012 | Nock ................ B60N 2/2252 297/362 |

FOREIGN PATENT DOCUMENTS

| | | | |
|---|---|---|---|
| DE | 102005058367 A1 | 6/2007 | |
| IT | EP 1818129 A1 * | 8/2007 | ......... B23K 26/0661 |
| JP | 2011186173 A | 9/2011 | |

OTHER PUBLICATIONS

International Search Report dated Jan. 4, 2013, Application No. PCT/US2012/058867, filed Oct. 5, 2012.
International Preliminary Report on Patentability dated Apr. 8, 2014, Application No. PCT/US2012/058867, filed Oct. 5, 2012.
Office Action issued on Oct. 30, 2015, in corresponding Chinese Application No. 2012800429105 (published as 104185570), filed on Mar. 4, 2014.

* cited by examiner

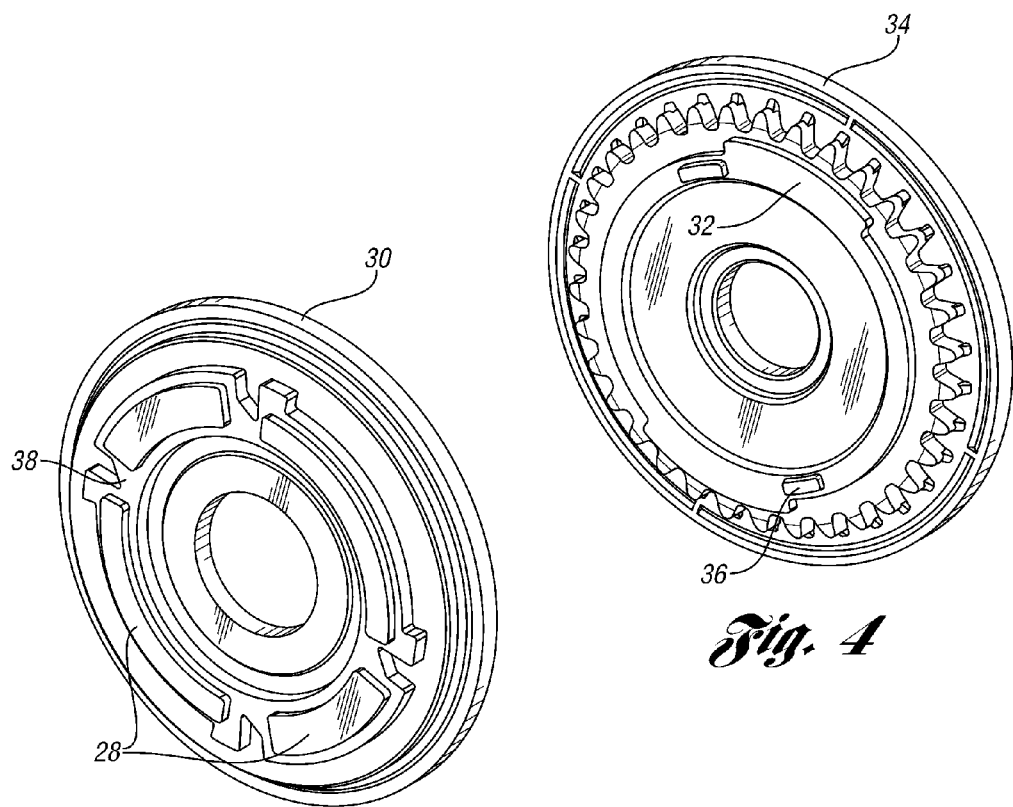
Fig. 3
Fig. 4
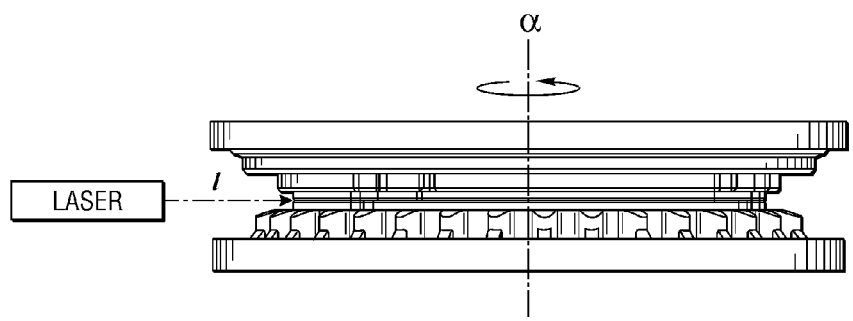
Fig. 5

SEAT RECLINER WITH EASY ENTRY RELEASE AND METHOD OF MANUFACTURING SAME

CROSS-REFERENCE TO RELATED APPLICATIONS

This application is a U.S. national phase of PCT Application No. PCT/US2012/058867, published as WO2013/052743, filed Oct. 5, 2012, which claims the benefit of U.S. Provisional Application No. 61/626,973, filed Oct. 6, 2011, the disclosures of which are hereby incorporated by reference in their entirety.

TECHNICAL FIELD

The present invention relates to seat back reclining mechanisms that cooperate with an easy entry seat release mechanism and methods for manufacturing same.

BACKGROUND

Seat back adjustment mechanisms and easy entry seat release mechanisms are well known. One example of an existing combined, disc-type seatback recliner/easy entry mechanism is described in U.S. Pat. No. 7,677,665. Other examples of prior patents disclosing such devices include but are not limited to U.S. Pat. Nos. 5,611,599; 5,755,491; 5,536,217; 4,930,841; 4,668,013; 4,634,181; and 4,629,251.

SUMMARY

An adjustment apparatus is provided for a vehicle seat that includes a seat base and a seat back that may be adjusted to change the angle of inclination of the seat back relative to the base. The seat back may be also released to allow the seat back to fold forward to permit easy entry to seats or storage areas located behind the vehicle seat. A first set of one or more recliner (also referred to herein as "comfort tilt") mechanisms are adjustable about a pivot axis to selectively hold the seat back at a selected angle within a range of tilt angles. Another set of one or more mechanisms connects one of the first set of recliners to the seat back and is attached coaxially to the first recliner. In the disclosed embodiment the second set includes at least one "easy entry" mechanism which is adjustable to pivot the seat back about the pivot axis between its selected tilt angle and a forwardly folded position that allows for access to the area behind the seat.

In one disclosed embodiment, a continuous-type recliner mechanism and a discontinuous-type easy entry mechanism are coaxially joined and mounted on the pivoting axis of the seat back so that the continuous mechanism is operable for comfort adjustment of the seat back and the discontinuous mechanism is operable to dump the seat back forward for easy entry when desired.

The easy entry mechanism includes a first interface located on the outer surface of the mechanism's teeth plate, and the comfort tilt mechanism includes a second interface located on the outer surface of that mechanism's gear plate. The easy entry and comfort tilt mechanisms are welded together at the first and second interfaces using a radial laser welding process to obtain the combined comfort tilt and easy entry functions in a single, compact package. The first and second interfaces may be oriented on the surfaces, respectively, of the mechanisms' adjoining plates to minimize contact and effect of the laser beam on other surfaces/components of the mechanisms during the welding process.

BRIEF DESCRIPTION OF THE DRAWINGS

FIG. 3 is a perspective view of an easy entry teeth plate including a first weld interface;

FIG. 4 is a perspective view of a continuous type comfort tilt recliner gear plate including a second weld interface;

FIG. 5 is a partial side view of one embodiment of the disclosed recliner system;

DETAILED DESCRIPTION

The disclosed system, as illustrated in the Figures, includes two or more adjustment mechanisms which are combined to form a system that functions to provide adjustment of a vehicle seat back relative to the seat base. The disclosed adjustment mechanisms may provide for adjustment of the seat back by the occupant to a desired angle of inclination, as well as provide quick release of the seat back to fold it forward to permit easy entry to seats or storage areas located behind the vehicle seat.

Figure 1:
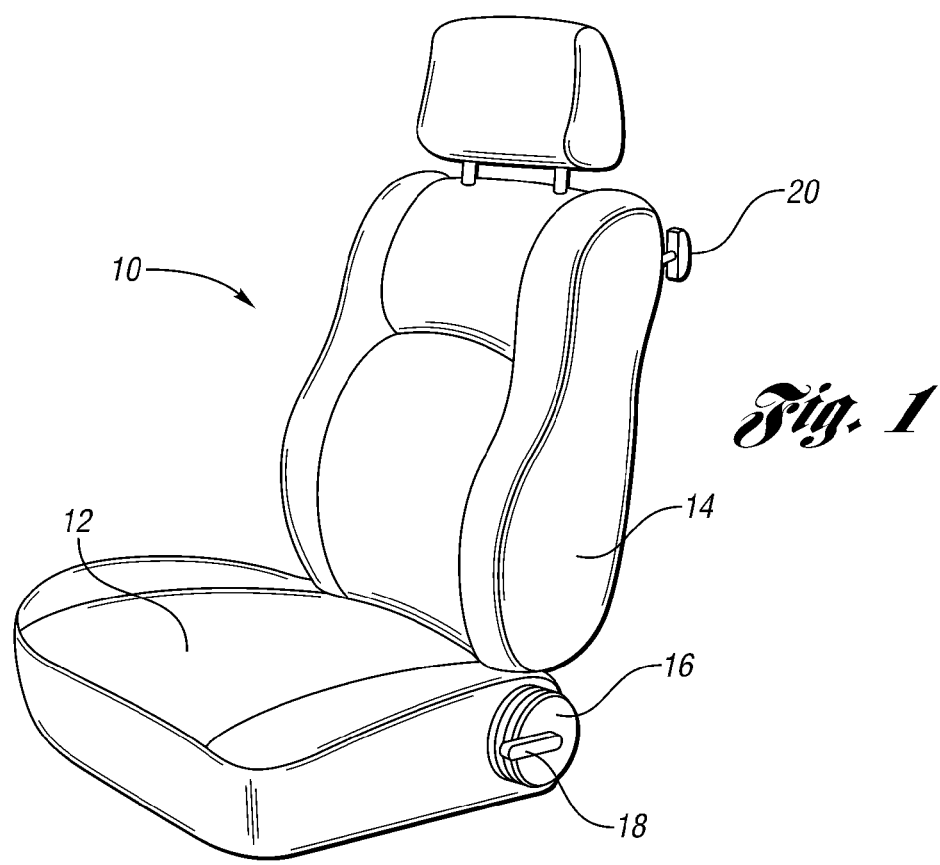
FIG. 1 is a perspective view of a vehicle seat that is provided with a coaxial comfort tilt and easy entry recliner assembly.

Referring to FIG. 1, a vehicle seat 10 is illustrated that includes a seat base 12 and a seat back 14. A recliner/easy entry assembly 16 is used to adjust the angular orientation of the seat back 14 relative to the seat base 12 in a comfort adjustment mode. The assembly 16 also permits the seat back 14 to be folded flat over the seat base 12 in an easy entry with memory mode of operation. An adjustment handle 18 may be provided on the twin recliner assembly 16 to permit manual adjustment of the twin recliner assembly 16, such as for the previously described angular adjustment of the seat back 14. An easy entry release handle 20 may be provided on the seat back 14 to actuate the easy entry portion of the twin recliner assembly 16.

Figure 2:
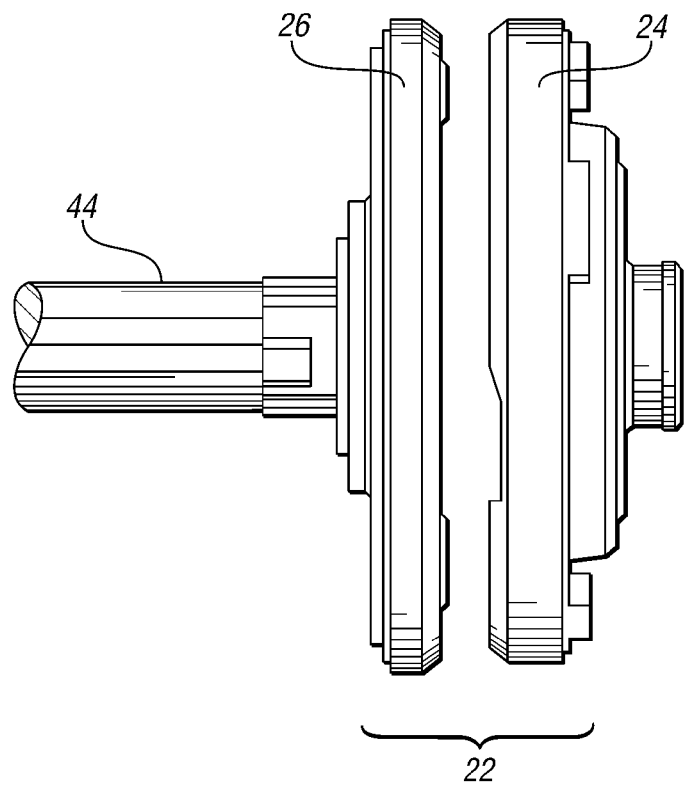
FIG. 2 is a front view of a one embodiment of a comfort tilt/easy entry recliner assembly.

Referring to FIG. 2, in one embodiment of the disclosed recliner system 22, a disc-type, continuous comfort tilt recliner mechanism 24 is mated coaxially with a disc-type, discontinuous easy entry mechanism 26 so that the continuous recliner mechanism is operable to provide selectable adjustment of the inclination of the seat back 14 within small increments to provide a comfortable seating position for the seat occupant, while the discontinuous mechanism provides the capability for quick release and forward folding movement of the seat back to position the seat back 14 out of the way to provide entry or access to seats or storage located rearward of the seat 10.

Referring to FIGS. 3-5, the continuous mechanism 24 and the discontinuous mechanism 26 shown in FIG. 2 are combined by welding the two mechanisms on their adjoining surfaces at a first interface 28 located on the easy entry recliner teeth plate 30 and a second interface 32 located on the continuous gear plate 34. In one embodiment of the disclosed system, the first interface 28 and second interface 32 are welded using a rotating laser welding operation in which the assembly is oriented relative to the laser beam path such that the beam is directed axially from the circumferential edge of the mechanisms at their adjoining surfaces such that contact of the beam and, therefore, the resultant heating effects, are directed primarily at the first and second weld interfaces.

In the embodiment depicted in FIGS. 3-5, the first interface 28 is configured as four flat, generally arcuate surfaces that are raised (that is, the planar surfaces of the first interface 28 are located radially outward from the remainder of the outer surface of the teeth plate 30) such that the first interface 28 will be the contacting surface with the second interface 32 when the teeth plate 30 and the gear plate 34 are placed face-to-face to join the mechanisms 24 and 26. In this disclosed embodiment, the surfaces defining the first interface 28 are discontinuous, but define a band extending substantially around the circumference of the teeth plate 30. The second interface 32 of the gear plate 34 is formed on the outer surface of the gear plate 34, and is a flat surface similarly raised from the remainder of the outer surface of the gear plate 34 such that when the two mechanisms 24 and 26 are placed side-by-side to be joined, the generally playing planar first interface 28 and second interface 32 are the contacting surfaces between the mechanisms 24 and 26.

In this disclosed embodiment, one or more tabs 36 may be located about the second interface 32 such that the tabs 36 register within openings 38 on the outer surface of the teeth plate 32 register the two mechanisms in the desired angular orientation with respect to each other prior to welding the mechanisms together.

It will be appreciated that the shape and dimension of the first interface 28 and the second interface 32 may be varied to optimize the strength of the weld and the speed and efficiency of the welding process, depending upon the size and physical performance requirements of the mechanisms 24 and 26. For example, the first interface 28 may be configured to extend continuously about the entire circumference of the teeth plate such that the contact of the first interface 28 and second interface 32, and the resulting weld site, extends as a continuous band around the circumference of the mechanisms 24 and 26. Similarly, the radial dimension of each of the surfaces comprising the first interface 28 may be varied depending upon the physical requirements of the mechanisms to effectuate a suitable weld with minimal heat exchange between the laser and the mechanisms 24 and 26 during the welding process.

In the embodiment shown in FIG. 5, each of the mechanisms 24 and 26 may be mounted on a rotating fixture for rotation about their coaxial center axes, α. A suitable laser is mounted such that the path of the laser beam is directed radially (that is, transverse to the axis of rotation α of the assembled mechanisms). The laser is then suitably powered so that the beam, l, strikes at the peripheral edges of the first interface 28 and the second interface 32 28 the mechanisms 24 and 26 enough to weld the adjoining teeth plate 30 and gear plate 34 at the interfaces 28, 32. As the beam is powered, the mechanisms 24 and 26 are rotated on the fixture such that the beam l strikes the peripheral edge of the teeth plate 30 and the gear plate 34 about the entire circumference of the rotating mechanisms 24, 26. It will be appreciated that, by axially directing the laser along the contact plane of the mating first and second interfaces 28, 32 and rotating the mechanisms 24 and 26 relative to the source of the laser beam, the mechanisms can be quickly welded with minimal effect by the laser beam on other surfaces/components of the two mechanisms. It will also be appreciated that various variations of this disclosed axial laser welding method may be utilized without departing from the spirit of the invention, such as, for example, fixing the mechanisms 24 and 26 in place and rotating the laser source around the perimeter of the fixed mechanisms 24 and 26.

Figure 6:
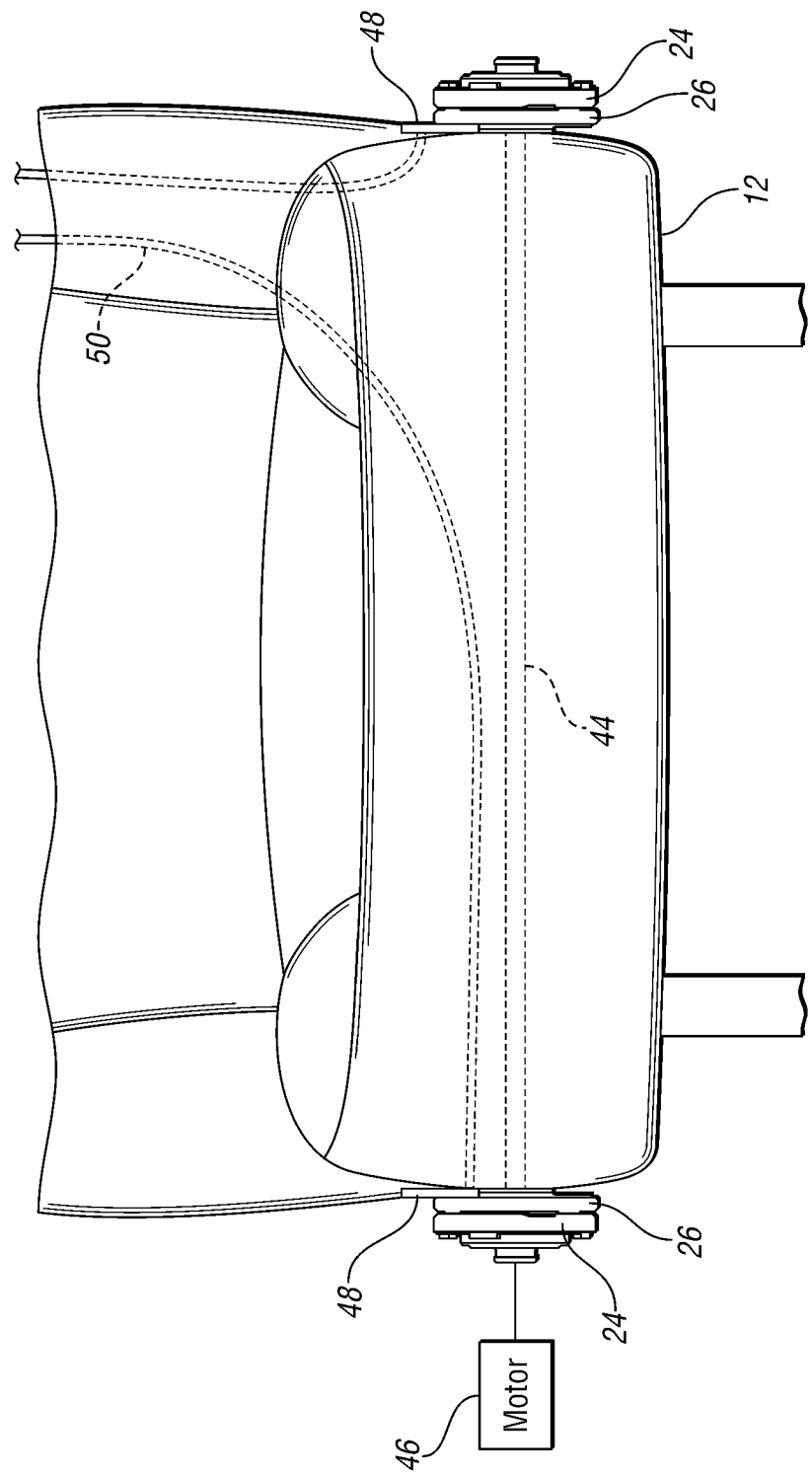
FIG. 6 is a fragmentary front elevation view of a vehicle seat that is provided with a continuous/easy entry recliner assembly that is attached to opposite sides of a seat base that optionally may be provided with a motor according to one disclosed embodiment.

Referring now to FIG. 6, a seat base 12 and seat back 14 are shown with a pair of recliner/easy entry assemblies 22 (shown in FIG. 2) on a first side and a second side of the seat base 12. The recliner/easy entry assemblies 22 on each side include a continuous comfort tilt recliner 24 that is connected to a discontinuous easy entry positioner 26 at adjoining first and second weld surfaces located on the facing plates of the two mechanisms. The shaft 44 connects the assemblies 22 through the seat base 12. In the comfort adjustment mode, the motor 46 (or the manual knob, not shown) may be used to turn the continuous recliner 24 on one side of the seat with the rotation of the shaft 44 communicating the rotation to the other side. A lever 48 is operatively connected to the easy entry mechanisms 26 that are provided inboard of the continuous tilt recliners 24 on both sides of the seat base 12. The levers 48 are operated by control cables 50 that extend to the easy entry release handle 20 (shown in FIG. 1). The easy entry release handle 20 is actuated to shift the control cables 50 and pivot the levers 48 to release the discontinuous easy entry recliner 26.

It will be appreciated that the disclosed assembly allows for combining multiple seat back adjustment features into a single, compact package using existing disc-type adjustment mechanisms. There is a wide variety of seat adjustment mechanisms of both the continuous and discontinuous type. Thus, even though specific designs of these types of recliners are specifically disclosed, the invention should not be interpreted as being limited to combinations of any specific types of recliner. Continuous recliners are continuously engaged and do not lend themselves to quick release for rapid travel of the seat back, which is desirable such as, for example, to fold the seat back quickly forward for easy entry to the area rearward of the seat. Discontinuous recliner mechanisms may be used for comfort adjustment and/or to provide the quick fold-forward action desired for easy entry. Conventional discontinuous recliner mechanisms are easily adapted to provide the easy entry function and are therefore incorporated into the disclosed recliner system along with either a continuous mechanism, or, alternatively, a second discontinuous mechanism, to provide both comfort tilt of the back rest, and quick fold forward of the back rest for easy entry.

Examples of the several combinations of existing recliner mechanisms that may be adapted to provide both comfort tilt and easy entry are also disclosed in U.S. Publication No. 2012/0205956, titled "SEAT RECLINER WITH COAXIAL EASY ENTRY RELEASE".

Figure 7:
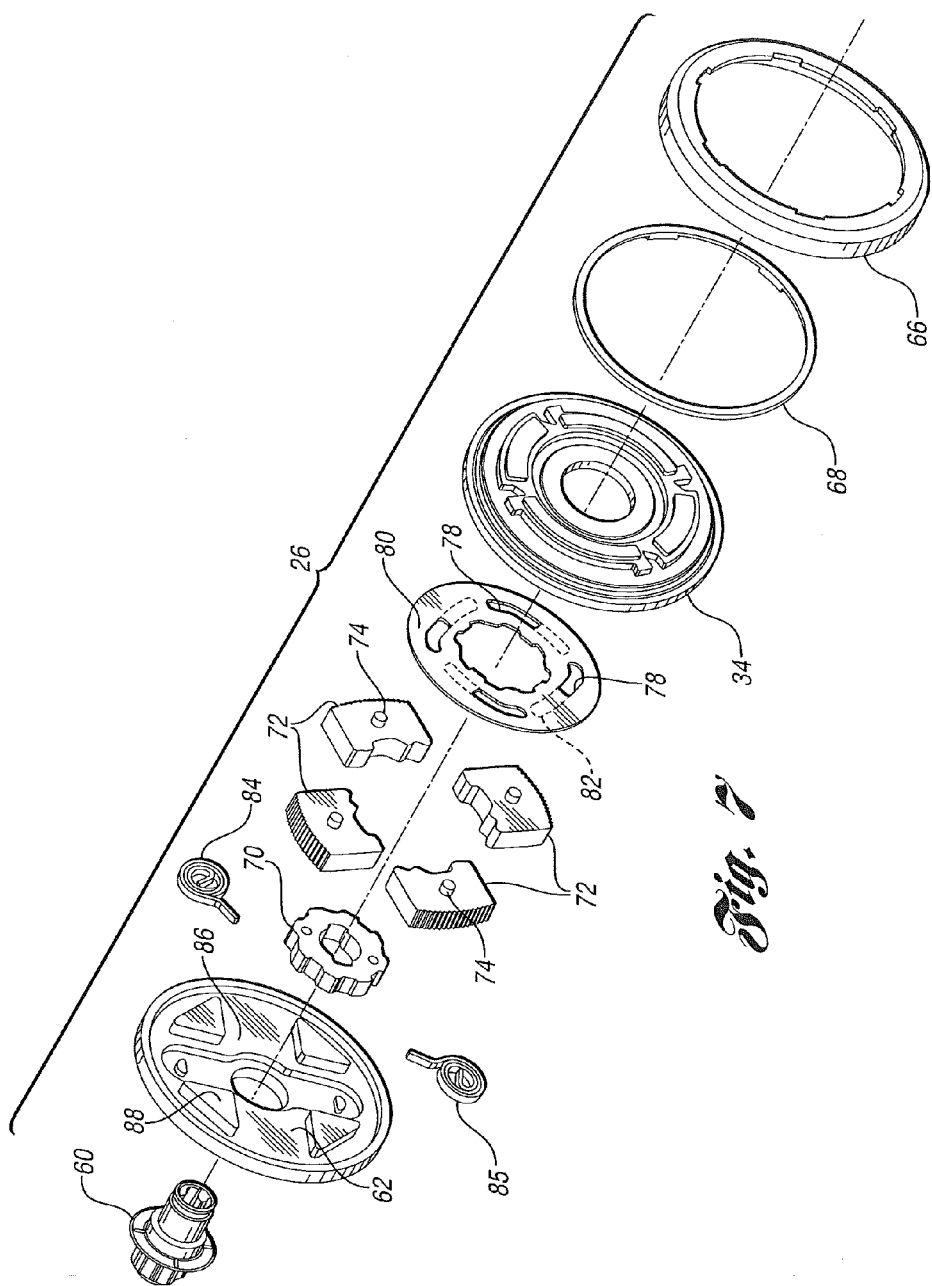
FIG. 7 is an exploded perspective view of a typical disc-type continuous comfort tilt recliner.
Figure 8:
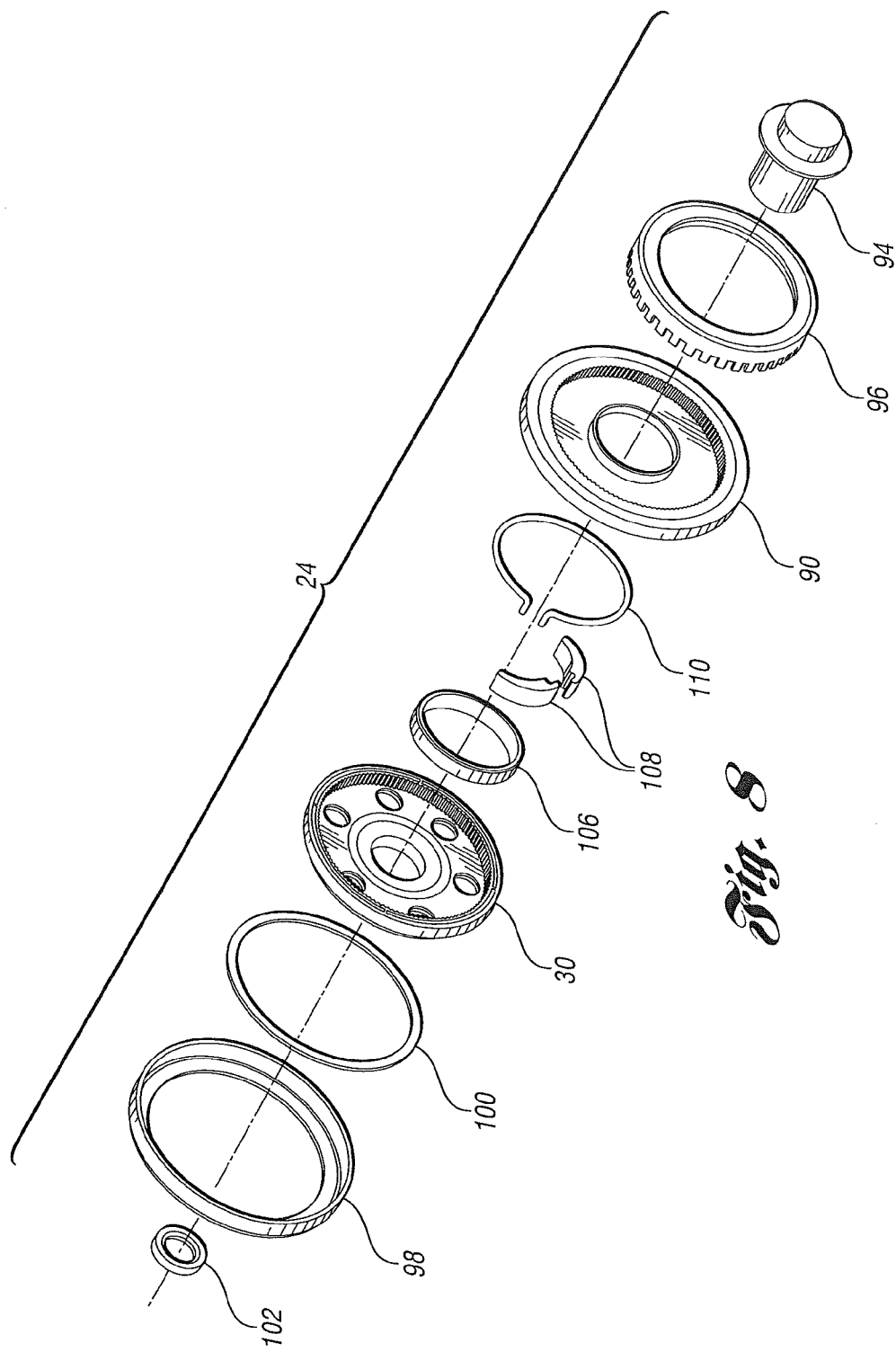
FIG. 8 is an exploded perspective view of a typical easy entry mechanism that is attached to the continuous recliner of FIG. 7 by radial laser welding to form a comfort tilt/easy entry recliner assembly.

Referring to FIGS. 7 and 8, two of the mechanisms employed in a comfort tilt/easy entry assembly 22, such as previously described, are shown in exploded perspective views. It should be understood that the mechanisms shown in FIGS. 7 and 8 are intended as mere examples of recliner mechanisms that may be used in accordance with the present invention. The portion of the assembly 22 shown in FIG. 7 includes an exemplary discontinuous easy entry recliner 26 while the portion of the assembly 22 shown in FIG. 8 includes an exemplary continuous comfort tilt recliner 24.

Referring to FIG. 7, a hub 60 is illustrated that is adapted to be connected to the shaft 44 shown in FIG. 6. A guide plate 62 is assembled to a teeth plate 34 and held together by means of a case ring 66 on the outer periphery of the plates 62, 34. The hub 60 extends through the guide plate 62 and teeth plate 34. A spacer 68 is provided between the case ring 66 and the teeth plate 34 for the purpose of noise reduction. A cam 70 is secured to the hub 60 and is used to extend and retract a plurality of pawls 72 that are driven into engagement with, and released from, the teeth plate 34 by rotating the hub 60 and cam 70 with the shaft 44.

Each of the pawls 72 includes a protrusion 74 that adapted to be received in corresponding slots 78 formed in a control plate 80. The control plate 80 is used to hold the pawls 72 out of engagement with the teeth plate 34 until the seat back 14 is adjusted to the desired angular orientation relative to the seat base 12. The same general arrangement may be used to provide an easy entry mode of operation by providing a plurality of elongated slots 82 in the control plate 80. The elongated slots 82 are shown in phantom lines in FIG. 7. By elongating the slots, a range of free rotation of the seat back 14 may be extended to provide free travel between the adjusted position and a fold flat position of the seat back 14.

The range of motion may be approximately 90 degrees free travel and two latching positions may be established corresponding to the two positions of the seat back. When the seat back is returned to the upright position, the discontinuous comfort recliner 50 remains in the same position and thereby provides a "memory" of the previous comfort adjustment position. In other embodiments of the discontinuous recliner, mechanical end stops (not shown) may be provided on the guide plate 62 and/or teeth plate 34 in place of the slots 82 in the control plate, to provide a desired range of motion.

A plurality of springs 84, 85 are mounted to the guide plate 62 to bias the cam 70 to engage the pawls 72 causing them to engage the teeth plate 34. The pawls 72 are received in channels 86 formed by guides 88 that are integrally formed in the guide plate 62.

The second interface 32 is formed, such as by machining, on the outwardly facing surface of the teeth plate 34. The interface 32 is to be welded to the mating first interface 28 on the gear plate 30 of the continuous comfort tilt mechanism 24 to facilitate connecting the discontinuous easy entry recliner 26 to the continuous recliner 24 illustrated in FIG. 8.

Referring to FIG. 8, the continuous recliner 24 is shown to include an inner gear 1 plate 90 that is received by an outer gear plate (or teeth plate) 30 in a continuously meshing relationship. A driver 94 is received within the inner gear plate 90 and the outer gear plate 30. A cover 96 is retained by the driver to provide a lubricant seal and exclude contamination from the inner and outer gear plates 90 and 30. A case ring 98 holds the inner and outer gear plates 90, 30 together in a relatively rotatable relationship. A spacer 100 is provided between the case ring 98 and the outer gear plate 30. A retainer clip 102 is secured to the hub 94 to retain the hub within the gear plates 90 and 30. A bearing ring 106 is retained in the outer gear plate 30. A pair of wedges 108 is inserted inside the bearing ring 106. Each of the wedges is urged apart by means of a spring 110. The wedges 108 provide an eccentric connection between the inner and outer gear plates 90 and 30 so that as the inner gear plate 90 is rotated, the outer gear plate 30 rotates incrementally.

The first interface 28 is formed, such as by machining, on the outwardly facing surface of the outer gear plate 30. The interface 28 is to be welded to the mating second interface 32 on the teeth plate 34 to facilitate connecting the discontinuous easy entry recliner 26 to the continuous recliner 24 illustrated in FIG. 7.

Figure 9:
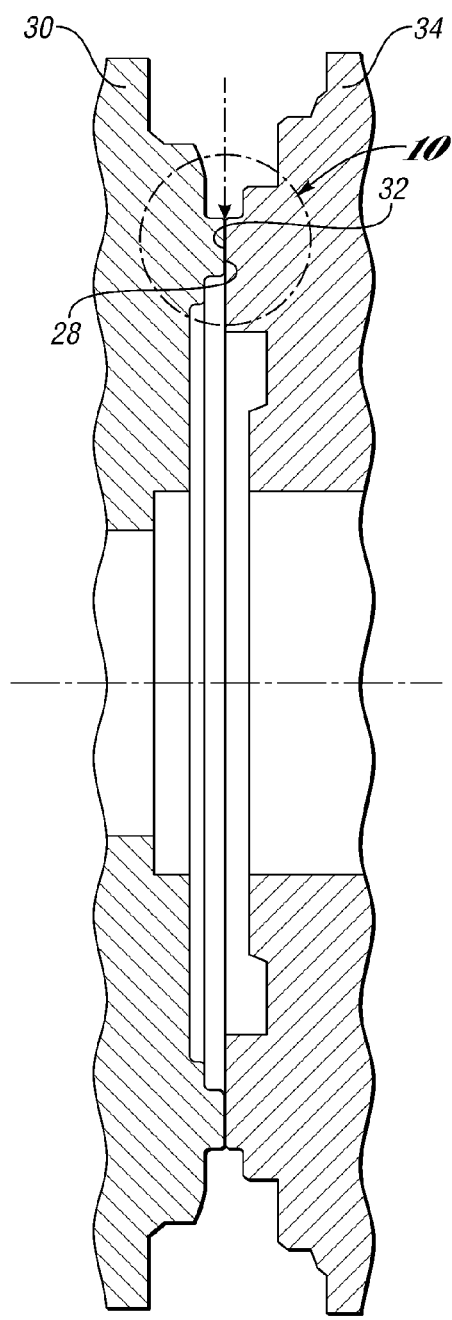
FIG. 9 is a side cross-sectional view showing the laser path and the adjoining surfaces of the comfort tilt and easy entry mechanisms.

FIG. 9 illustrates the mating surfaces of the first interface 28 and the second interface 32 in the disclosed embodiment of FIGS. 3-5. It will be appreciated that, by projecting the laser beam in an radial direction (that is transverse to the rotational axis of the assembly 22) the beam strikes and heats the adjoining teeth plate 30 and gear plate 34 only at the weld site locations defined by the first interface 28 and the second interface 32. This allows for a more precise, controlled application of the welding energy to the desired location, thereby minimizing unwanted effects on other areas/components of the mechanisms 24 and 26 during welding.

Figure 10:
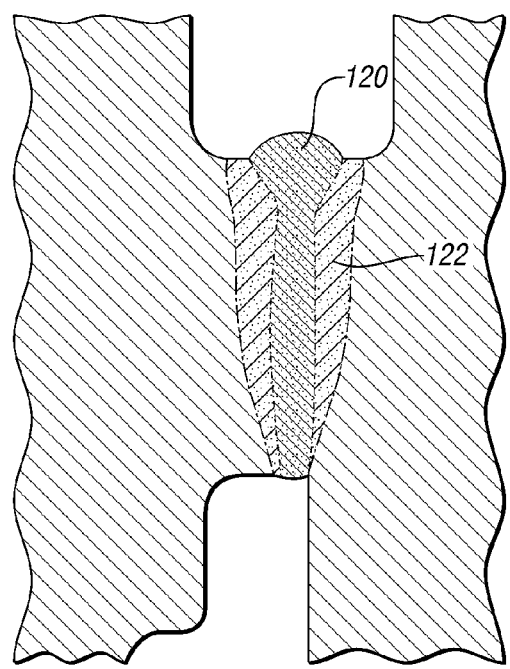
FIG. 10 is a partial side cross-sectional view of a typical weld obtained using a radial laser welding method for joining the comfort tilt and easy entry mechanisms.

Referring now to FIG. 10, the disclosed first interface 28 and second interface 32 designs, coupled with the axially directed laser weld beam, minimize ancillary effects by the beam on the plates 30, 34 and other mechanism components, since the beam can be confined to strike specifically in the area of the first interface 28 and second interface 32 without traveling through the mechanisms' materials other than in the immediate vicinity of the weld site. In the illustrated example, the weld is obtained, at 120, with only a slight area, 122, of the plates 30, 34 also being metallurgically affected by the heat of the laser welding.

A conventional fiber laser may be utilized to perform the disclosed radial welding method. It will be appreciated that the various laser welding process parameters may be adjusted to obtain the desired weld strength, minimize undesired effects on surrounding surfaces, and minimize weld/assembly time. For example, the dimensions, and, most preferably, the height, h, of the weld site, the laser power, and the actuation time can be varied, dependent upon the material and required weld strength to achieve an optimal weld and/or maximize the efficiency of the welding/assembly process.

In one embodiment, 4130 steel is utilized for the first interface 28 and second interface 32. In this embodiment, the first interface 28 and second interface 32 defined a weld surface that is shaped as a continuous ring which extends from an inner diameter of about 36 mm to an outer diameter of about 44 mm on a comfort tilt/easy entry assembly having an overall diameter of about 77 millimeters. This weld band of approximately 4 mm in height, h, at a distance of from about 18 to 22 mm from the assembly's axis of rotation, has been found to be more than adequate to withstand the torque forces which the assembly is expected to be exposed to in its normal use.

The weld interface shape and dimensions may vary depending upon the overall dimension and/or the desired performance characteristics (e.g., torque requirements) of the assembly. The weld interface shape, dimensions, and laser welding parameters may, of course, also vary as other types of steel, such as, for example, 4140/42CrMo4 or 1018/C15 steel, as well as other suitable metals or alloys, are utilized for the outer plates and/or interfaces.

While specific embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An adjustment apparatus for a vehicle seat that includes a seat base and a seat back that is pivotally connected to the seat base to pivot about an axis, the apparatus comprising a generally disc-shaped first adjustment mechanism including at least two plates that are rotatable relative to one another to provide for rotation of the seat back relative to the seat base about the axis, each of the plates of the first adjustment mechanism including an inner surface and an outer surface, wherein the outer surface of one of the plates includes a generally planar first interface, and a second, generally disc-shaped adjustment mechanism including at least two plates that are rotatable relative to one another to provide for rotation of the seat back about the axis, each of the plates of the second adjustment mechanism including an inner surface and an outer surface, wherein the outer surface of one of the plates includes a generally planar second interface, wherein the first and second adjustment mechanisms are mounted adjacent each other such that the first interface and the second interface abut, creating at least one contact location and creating a space between the plates at locations other than the abutting first and second interfaces, and the space between the plates is unobstructed in a radial direction from the outer perimeters of the plates to at least one of the contact locations between the first interface and the second interface, such that the first and second adjustment mechanisms are coaxially joined at the first interface and second interface by radial laser welding without the weld beam striking the plates at locations other than the at least one contact location between the first interface and the second interface.

2. The adjustment apparatus of claim 1 wherein the first adjustment mechanism is an easy entry adjustment mechanism which provides for rotation of the seat back about said axis from a use position to a forwardly folded, non-use position to allow access to an area behind the seat, and wherein the second adjustment mechanism is a seat back inclination adjustment mechanism which provides for rotation of the seat back about said axis to a variety of selectable angles of inclination relative to the seat base.

3. The adjustment apparatus of claim 1 wherein the first interface and the second interface defines a weld surface that extends as a continuous band surrounding said axis.

4. The adjustment apparatus of claim 1 wherein the first interface and the second interface defines a weld surface that extends as a discontinuous band surrounding said axis.

5. A vehicle seat comprising:
a seat base;
a seat back that is pivotally connected to the seat base to pivot about an axis;
generally disc-shaped first adjustment mechanism including at least two plates that are rotatable relative to one another to provide for rotation of the seat back about said axis, each of the plates of the first adjustment mechanism including an inner surface and an outer surface, wherein the outer surface of one of the plates includes a generally planar first interface; and
generally disc-shaped second adjustment mechanism including at least two plates that are rotatable relative to one another to provide for rotation of the seat back about said axis, each of the plates of the second adjustment mechanism including an inner surface and an outer surface, wherein the outer surface of one of the plates includes a generally planar second interface, wherein the first and second adjustment mechanisms are mounted adjacent each other such that the first interface and the second interface abut, creating at least one contact location and creating a space between the plates at locations other than the abutting first and second interfaces, and wherein the space between the plates is unobstructed in a radial direction from the outer perimeters of the plates to at least one of the contact locations between the first interface and the second interface, and
wherein the first adjustment mechanism and the second adjustment mechanism are coaxially joined at the first interface and second interface by radial laser welding without the weld beam striking the plates at locations other than the at least one contact location between the first interface and the second interface.

6. The vehicle seat of claim 5 wherein the first adjustment mechanism is an easy entry adjustment mechanism which provides for rotation of the seat back about said axis from a use position to a forwardly folded, non-use position to allow access to an area behind the seat, and wherein the second adjustment mechanism is a seat back inclination adjustment mechanism which provides for rotation of the seat back about said axis to a variety of selectable angles of inclination relative to the seat base.

7. The vehicle seat of claim 5 wherein the first interface and the second interface defines a weld surface that extends as a continuous band surrounding said axis.

8. The vehicle seat of claim 5 wherein the first interface and the second interface defines a weld surface that extends as a discontinuous band surrounding said axis.

9. A method of manufacturing an adjustment apparatus for a vehicle seat including:
providing a first adjustment mechanism including at least two plates that are rotatable relative to one another to provide for rotation of the seat back about a fixed axis, each of the plates of the first adjustment mechanism including an inner surface and an outer surface;
providing a generally planar first interface on at least one outer surface of one of the first adjustment mechanism plates;
providing a second adjustment mechanism including at least two plates that are also rotatable relative to one another to provide for rotation of the seat back about said axis, each of the plates of the second adjustment mechanism including an inner surface and an outer surface;
providing a generally planar second interface on at least one outer surface of one of the second adjustment mechanism plates;
mounting the first and second adjustment mechanisms adjacent each other such that the first interface and the second interface abut, creating at least one contact location and creating a space between the plates at locations other than the abutting first and second interfaces, and the space between the plates is unobstructed in a radial direction from the outer perimeters of the plates to at least one of the contact locations between the first interface and the second interface; and
coaxially joining the first and second adjustment mechanisms by radial laser welding the mechanisms at the first interface and second interface without the weld beam striking the plates at locations other than the at least one contact location between the first interface and the second interface.

10. The method of claim 9 further including the steps of:
mounting each of the first and second adjustment mechanisms on a rotating fixture for rotation about said axis;

mounting a laser such that the path of the laser beam is directed radially at the contact location of the first interface and the second interface;

powering the laser so that the beam strikes at the peripheral edges of the first interface and the second interface to weld the plates at the first and second interfaces; and rotating the fixture such that the laser beam strikes the first interface and second interface about the entire circumference of the rotating mechanisms.

* * * * *